May 18, 1965

E. S. HOLLISTER 3,183,738

ADJUSTING SCREW SPRING CLIP

Filed Jan. 21, 1963

Inventor:
Edwin S. Hollister,
by Laurence R. Kosefoot
His Attorney

United States Patent Office 3,183,738
Patented May 18, 1965

3,183,738
ADJUSTING SCREW SPRING CLIP
Edwin S. Hollister, Allentown, Pa., assignor to General
Electric Company, a corporation of New York
Filed Jan. 21, 1963, Ser. No. 252,671
9 Claims. (Cl. 74—526)

This invention relates to a screw type adjustment mechanism, and more particularly to a device for preventing rotational slippage of the screw and for limiting the rotational movement of the screw.

An adjusting screw is a simple but effective arrangement for adjusting a movable arm of a thermostatic control or a movable member of similar control devices. The axial movement of the screw as it is rotated within a threaded reference member provides a relatively accurate manner of making adjustments; however, a problem in maintaining this accuracy is how to prevent inadvertent rotational movement of the screw. This problem is particularly troublesome when wide tolerances of large volume production are permitted. Also, the continual heating and cooling to which such adjusting mechanism is subjected when used in an appliance, such as a toaster, tends to magnify the slippage problem due to the resulting expansion and contraction of the mating threaded portions. It is also desirable that a convenient arrangement be provided for limiting the rotational movement of the adjusting screw between predetermined limits marking the adjustment range.

It is a primary object of the present invention to provide a unique but simple and inexpensive device for preventing inadvertent slippage of an adjustment screw.

It is a further object of this invention to provide a spring clip for preventing slippage of an adjustment screw and for limiting the rotational movement of the adjusting screw between predetermined limits.

Briefly stated, the invention relates to a fastening device or clip for an adjusting screw. The clip may be made from a strip of resilient sheet material doubled on itself to form two arms or sections which define an acute angle when the arms are in an unstressed or uncompressed position. One arm is provided with an opening adapted to loosely receive an adjusting screw provided with a shank having a straight sided cross-section. The other arm has an opening formed to be substantially straight sided to receive and mate with the shank of the adjusting screw. Thus, when the screw is placed through the openings in the clip, rotation of the screw will cause rotation of the clip. By placing the clip under axial compression, the resiliency of the clip may be utilized to provide an axial force sufficient to provide friction between the screw and the member receiving the screw for preventing inadvertent rotation of the screw. If desired, the clip may also be formed to cooperate with the screw receiving member to limit the positive rotational movement of the screw within predetermined boundaries.

Further features, objects and advantages will become apparent with reference to the following drawing in which.

Figure 1:
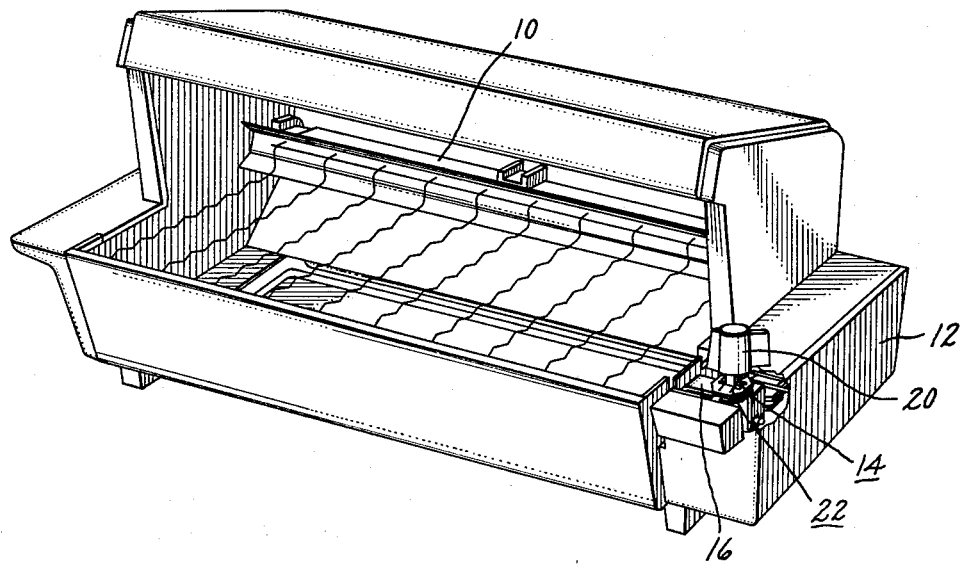
FIG. 1 is a perspective view of a toaster incorporating the adjusting mechanism of the invention.

As mentioned, the adjusting mechanism of the invention may be utilized in a wide variety of products or appliances. An example of one such appliance is the toaster of FIG. 1 which includes a heating element 10 controlled by a timing unit (not shown) contained within the end housing 12. The timing unit may include an adjustable thermostat of any well known variety for determining the length of time which the heating element 10 will be energized for each toasting operation. The adjustable element 13 (shown schematically in FIG. 2) of the thermostat may be simply controlled by means of an adjusting screw 14 threadably mounted in a bracket 16. The lower end 18 of the screw 14 cooperates with the movable element 13 of the thermostat to vary its operation. The upper end of the screw may be provided with a suitable knob 20 or other control by which the screw may be manually rotated to the desired position. The top surface of the housing 12 may be provided with suitable indicia (not shown) for indicating the temperature setting, for example, light, medium or dark.

Figure 4:
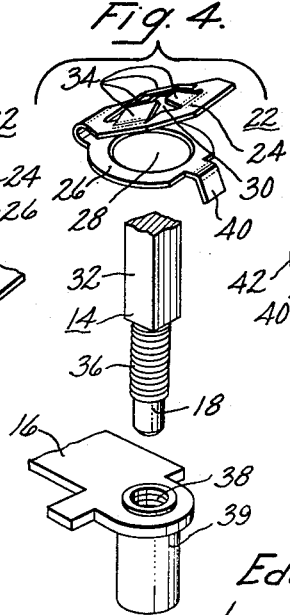
FIG. 4 is an exploded perspective view of the mechanism prior to assembly.

One difficulty with the use of an adjusting screw is that the screw may have a tendency to inadvertently rotate and thus affect the operation of the thermostat or other mechanism being controlled. In accordance with the invention, a unique but simple fastening device in the form of a spring clip 22 is provided for preventing slippage of the adjusting screw. As may be seen from FIGS. 2–4, the clip is formed from a strip of resilient sheet material doubled on itself to form two planar sections or arms 24 and 26. While no specific resilient material is required, metal is preferable. When the clip is in an unstressed or uncompressed position, the arms 24 and 26 may define an acute angle as seen in FIG. 4. The lower arm 26 is provided with an enlarged aperture 28 adapted to loosely receive the adjusting screw 14. The upper arm 24 is provided with an aperture 30, which is aligned with the lower aperture 28 and is adapted to receive the shank or unthreaded portion 32 of the screw 14.

Figure 2:
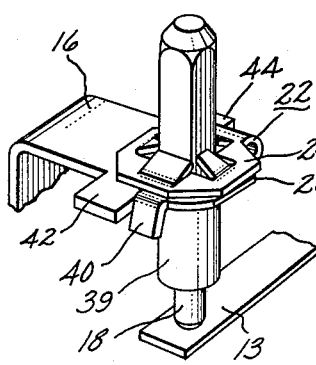
FIG. 2 is an enlarged perspective view of the assembled control mechanism.
Figure 3:
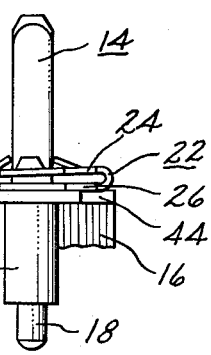
FIG. 3 shows a side elevation of the adjusting mechanism.

As may be seen from FIG. 2, the shank 32 is provided with a square cross-section and the aperture 30 in the upper arm is defined by a plurality of inwardly extending fingers 34 which form a substantially square opening slightly smaller than the shank 32 of the adjusting screw. Naturally, the shank 32 and the aperture 30 may be formed with cross-sections other than a square.

In assembly, the threaded portion 36 of the screw 14 is threaded into the threaded aperture 38 of insert 39 carried by the bracket 16. The upper end of the screw 14 is inserted through the enlarged opening 28 in the lower arm 26 and the upper arm 24 is then forced onto the square shank 32 of the screw 14. In doing this, the flexible fingers 34 are axially deflected on the screw shank 32 so that their edges grip the shank and prevent the upper arm 24 from being moved towards the upper end of the screw 14. When the screw 14 has been moved to a desired calibrated position, the clip 22 is axially compressed against the housing 16 to the position shown in FIGS. 2 and 3 wherein the lower surface of the lower arm 26 engages the upper surface of the housing 16 and the flexible fingers 34 grip the square shank 32 of the adjusting screw preventing the arm 24 from moving upwardly. The resiliency of the clip 22 provides an axial force which urges the screw 32 upwardly and causes its threads 36 to be tightly engaged with the threads of aperture 38. Conversely, the lower arm 26 of the clip 22 is urged against the bracket 16 creating a frictional force to thereby prevent inadvertent rotational slippage of the screw. The effectiveness of such a low cost fastening device can be easily appreciated.

It is desirable that the adjusting screw be provided with an arrangement to mark the limits of the adjustment range through which the screw is to be moved. To simplify operation of the knob 20 it is preferable that the knob be rotatable through an arc less than one revolution. In the present situation, the entire desired control range extends throughout an arc of only approximately 180°. To limit the movement of the control knob and adjusting screw through this arc, the spring clip 22, which rotates with the screw, has been uniquely provided with a tab 40 depending from the lower arm 26. The tab 40 cooperates with projections or stops 42 and 44 formed on the bracket 16. The adjusting screw 14 is shown in one extreme position in FIGS. 2 and 3 wherein one edge of the tab 40 engages the stop 42 to prevent further rotation of the screw in one direction. When the screw 14 is rotated in the opposite direction, the other edge of the tab 40 engages the stop 44 shown more clearly in FIG. 3.

It will be appreciated that the spring clip described herein can be economically manufactured by merely stamping a strip of resilient material to the desired shape with the desired apertures and then bending the part into the position shown in FIG. 4. This ease of manufacture together with its simplicity and effectiveness of operation make the value of the device readily apparent.

While a particular embodiment of the invention has been illustrated and described, modifications thereof will occur to those skilled in the art. Accordingly, it should be understood that this invention is not limited to the particular arrangement disclosed and it is intended in the appended claims to cover all such modifications which do not depart from the spirit and scope of the invention.

What I claim is:

1. The combination comprising an adjusting screw having a threaded portion and an unthreaded portion having a straight sided cross-section, a spring clip formed of a strip of resilient sheet material doubled on itself to form two arms defining an acute angle, one of said arms having a first opening loosely receiving said adjusting screw, and the other of said arms having a second opening aligned with said first opening and having a cross-section and size slightly smaller than the cross-section of the unthreaded portion receiving and engaging the unthreaded portion of said adjusting screw.

2. The combination comprising an adjusting member having a threaded portion and an unthreaded portion having a straight sided cross-section, a clip formed of a strip of resilient sheet material doubled on itself to form an upper and a lower arm defining an acute angle, said lower arm having a circular opening loosely receiving said adjusting member, said upper arm having an opening aligned with said lower arm opening and having a cross-section approximately equal to the cross-section of said unthreaded portion receiving and engaging the unthreaded portion of said adjusting member so that rotation of said member rotates the clip, and a stop tab depending from said lower arm to cooperate with a fixed member for limiting rotation of said clip and adjusting member.

3. The combination comprising an adjusting member having a threaded portion and an unthreaded portion having a straight sided cross-section, a spring clip formed of a strip of resilient sheet material doubled on itself to form two arms defining an acute angle when axially unstressed, one of said arms having an opening loosely receiving said adjusting member, the other of said arms having means defining an opening aligned with said one arm opening and receiving and engaging the unthreaded portion of said adjusting member so that the clip rotates with the adjusting member, and said means including means to prevent axial movement of the arm relative to said adjusting member when said clip arms are axially compressed.

4. An adjustment mechanism comprising an adjustment screw having a threaded portion and an unthreaded portion having a straight-sided cross-section, a spring clip formed of a strip of resilient sheet material doubled on itself to form two arms, one of said arms having a first opening loosely receiving said adjusting screw, the other of said arms having means defining a second opening aligned with said first opening and receiving and engaging the unthreaded portion of said screw so that rotation of the screw rotates the clip, a bracket having a threaded aperture threadably receiving the threaded portion of said adjusting screw, said means including means for holding said spring clip in axial compression against said bracket so that friction between the clip and the bracket prevents rotational slippage between said screw and said bracket.

5. An adjustment mechanism comprising an adjustment screw having a threaded portion and an unthreaded portion having a straight sided cross-section, a spring clip formed of a strip of resilient material doubled on itself to form two arms defining an acute angle when axially unstressed, one of said arms having an opening loosely receiving said adjusting screw, the other of said arms having a substantially straight sided opening aligned with said one arm opening and defined by a plurality of fingers receiving and engaging the unthreaded portion of said screw, and a bracket having a threaded aperture threadably receiving the threaded portion of said adjusting screw, said fingers being adapted to prevent axial movement of said other arm when said spring clip is compressed against said bracket so that said clip provides tension to prevent slippage between said screw and said bracket.

6. An adjustment mechanism comprising an adjusting screw having a threaded portion and an unthreaded portion having a square cross-section, a spring clip formed of a strip of resilient sheet material doubled on itself to form an upper and a lower arm, said lower arm having an opening loosely receiving said adjusting screw, said upper arm having means defining a square opening aligned with said lower arm opening and engaging the unthreaded portion of said screw, a bracket having a threaded aperture threadably receiving the threaded portion of said adjusting screw, said means including means for retaining said spring clip under axial compression against said bracket so that said clip prevents rotational slippage between said screw and said bracket, and stop means formed on said bracket and said clip for limiting the rotation of said spring clip and thus said adjusting screw.

7. In a toaster, an adjustment mechanism comprising an adjusting screw having a tip portion adapted to position a movable control element, a threaded portion and an unthreaded portion having a straight-sided cross-section; a bracket having a threaded aperture receiving the threaded portion of said screw; a spring clip formed from a strip of resilient sheet material doubled on itself to form first and second arms, said first arm having an opening loosely receiving said screw, said second arm having means defining an opening aligned with said first arm opening receiving and engaging the unthreaded portion of said screw so that the clip rotates with the screw, said means including means for preventing said second clip arm from axially moving on said screw once said clip has been axially compressed with said first clip arm in contact with said bracket whereby rotational slippage between said screw and said bracket is prevented.

8. An adjusting screw clip comprising a strip of flexible material doubled on itself to form two planar sections which diverge to define an acute angle when in an unstressed condition; means defining an enlarged opening extending through one of said sections; means defining a square opening extending through the other of said sections, said square opening being axially aligned with but considerably smaller than said enlarged opening; and a depending stop member formed on one of said planar clip sections.

9. An adjusting screw clip comprising a strip of flexible material doubled on itself to form two planar sections which diverge to define an acute angle when in an unstressed condition; means defining an enlarged opening extending through one of said sections; the other of said sections having a straight-sided opening aligned with said enlarged opening and defined by a plurality of inwardly extending fingers, said straight-sided opening being considerably smaller than said enlarged opening.

References Cited by the Examiner
UNITED STATES PATENTS

| | | |
|---|---|---|
| 435,126 | 8/90 | Thomas. |
| 2,295,685 | 9/42 | Place _____ 85—36 |
| 2,399,958 | 5/46 | Tinnerman _____ 85—36 X |

BROUGHTON G. DURHAM, *Primary Examiner.*

MILTON KAUFMAN, *Examiner.*